US012699206B2

(12) United States Patent
Hon et al.

(10) Patent No.: US 12,699,206 B2
(45) Date of Patent: Aug. 4, 2026

(54) PLANAR OPTIC HYBRID TELEPHOTO LENS

(71) Applicant: NORTHROP GRUMMAN SYSTEMS CORPORATION, Falls Church, VA (US)

(72) Inventors: Philip W.C. Hon, Redondo Beach, CA (US); Michael L. Dupuis, Redondo Beach, CA (US); Shu-i Wang, Redondo Beach, CA (US); Stephane Larouche, Redondo Beach, CA (US); Sze Wah Lee, Redondo Beach, CA (US); Katherine T. Fountaine, Redondo Beach, CA (US); David Ross Shafer, Falls Church, VA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 301 days.

(21) Appl. No.: 18/350,849

(22) Filed: Jul. 12, 2023

(65) Prior Publication Data

US 2025/0020829 A1 Jan. 16, 2025

(51) Int. Cl.
| | |
|---|---|
| *G02B 1/00* | (2006.01) |
| *G02B 13/02* | (2006.01) |
| *G02B 13/14* | (2006.01) |
| *G02B 27/00* | (2006.01) |

(52) U.S. Cl.
CPC ............. *G02B 1/002* (2013.01); *G02B 13/02* (2013.01); *G02B 13/14* (2013.01); *G02B 27/0025* (2013.01)

(58) Field of Classification Search
None
See application file for complete search history.

(56) References Cited

U.S. PATENT DOCUMENTS

| | | |
|---|---|---|
| 2015/0116569 A1 | 4/2015 | Mercado |
| 2021/0132256 A1* | 5/2021 | Park .................... G02B 27/0025 |
| 2023/0024433 A1 | 1/2023 | Yun et al. |
| 2023/0044716 A1 | 2/2023 | Han et al. |
| 2023/0094482 A1 | 3/2023 | Lee et al. |

(Continued)

OTHER PUBLICATIONS

Chen et al. "Broadband Achromatic Metasurface-Refractive Optics" Nano Letters, 2018, 7801-7808, 18.

(Continued)

*Primary Examiner* — Robert E. Tallman
(74) *Attorney, Agent, or Firm* — Shumaker, Loop & Kendrick LLP; John A. Miller

(57) ABSTRACT

A telephoto lens assembly including a primary lens sub-assembly having at least one lens, and being operable to collect and focus light to an intermediate focal location. The assembly further includes a secondary lens sub-assembly having at least one refractive lens, and being operable to collect and focus light from the primary lens sub-assembly. The lens assembly also includes a metacorrector positioned relative to the secondary lens sub-assembly and being responsive to the focused light from the secondary lens sub-assembly, where the metacorrector includes a meta-structure that is configured to correct aberrations in the light, provide focusing/defocusing power and/or to remove residual secondary color in the light.

20 Claims, 2 Drawing Sheets

(56) References Cited

U.S. PATENT DOCUMENTS

| | | | |
|---|---|---|---|
| 2023/0098924 A1 | 3/2023 | Lee et al. | |
| 2023/0127423 A1* | 4/2023 | Park | G02B 13/02 |
| | | | 359/356 |

OTHER PUBLICATIONS

Chen et al. "Will flat optics appear in everyday life anytime soon"
Applied Physics Letters, Mar. 9, 2021, 118, 100503.

* cited by examiner

PLANAR OPTIC HYBRID TELEPHOTO LENS

GOVERNMENT CLAUSE

This invention was made with Government support under Subcontract No. S-119-003-003 awarded by AFRL (Air Force Research Laboratory). The Government has certain rights in this invention.

BACKGROUND

Field

This disclosure relates generally to a telephoto lens assembly and, more particularly, to a telephoto lens assembly including a plano plano metacorrector for correcting beam aberrations.

Discussion of the Related Art

Refractive and reflective optical elements have a number of applications in various optical systems for focusing light and other electromagnetic waves. Some of these optical systems often require large apertures to collect enough light for their intended purpose and thus improvements in size and weight of the optical elements is often desirable. However, the use of conventional refractive optical materials such as glass, as well as materials for large mirrors such as SiC, is limited by weight, size and thickness, and thus it is challenging to provide large apertures using these components.

When designing a telephoto lens, which is usually an assembly of multiple lenses, typically, as mentioned, large apertures are desired to capture as much light as possible for a good signal to noise ratio and better angular resolution. A short physical total optical track length of the telephoto lens is also desired to provide a short footprint of the lens. Additionally, for distant object imaging applications with volume constraints, the lens telephoto ratio is an important figure of merit as it is a measure of the compactness of the system, where the telephoto ratio is defined as the objective lens' ratio of its physical total track length to its focal length. Typical telephoto ratios range from 0.6 to 0.9, where shorter telephoto ratios are often more desirable. Further, the shorter the track length, the more difficult it is to design the lens without aberrations. More corrective lenses (spherical and aspherical elements) can be added to the objective lens to correct those aberrations, but at the expense of growing the track length of the lens.

Optical metamaterials are artificially engineered materials that have optical properties that are a function of the material's native optical property (refractive index), sub-wavelength unit cell element motif, properties of the incident light, such as its incidence angle and polarization, and the configuration of its unit cells (periodic/aperiodic) rather than just the material's native chemical composition (refractive index). 2-D metamaterials, also known as metasurfaces, can be designed and fabricated as structural units to achieve desired diffractive optical properties and functionalities, such as focusing light with low loss, where such metasurfaces are known as metalenses. Metasurfaces or metalenses are ultra-thin flat optics that can be fabricated for visible and IR imaging. The unit cells or meta-atoms for these metalenses may include motifs such as pillars, holes, rings, crosses, etc. on the order of $\lambda_0/4$ in size periodically arranged on a transparent or reflective substrate, where the planar optic out of plane dimension can be on the order of $\lambda_0$, but could be smaller if the material index is large. The ability to fabricate optical quality wide-band flat metalenses and metamirrors (reflective elements) with good achromatic performance using conventional micro/nano-electronic fabrication techniques has been demonstrated in the art.

It is known in the art to employ planar optic metastructures, sometimes referred to as metacorrectors, to reduce first and third order aberrations in a beam, which improves the optical performance for imaging and non-imaging optical applications. Since metacorrectors are fabricated using modern semiconductor fabrication techniques, they also provide a low profile. These plano optics translate to reduced touch labor relative to conventional machining of lenses from a bulk material. Additionally, fabrication of metacorrectors are accomplished on a wafer scale, which translates to high volume and reduced cost, depending on the design.

Metacorrectors, a type of metalens, that employ meta-structures for correcting aberrations typically include Fresnel zones with a phase profile that varies from 0 to 360 degrees. The unit cells (meta-atoms) control the wave number, amplitude, phase and polarization of the scattered light.

DETAILED DESCRIPTION OF THE EMBODIMENTS

The following discussion of the embodiments of the disclosure directed to a telephoto lens assembly including a planar optic metacorrector is merely exemplary in nature, and is in no way intended to limit the disclosure or its applications or uses.

Figure 1:
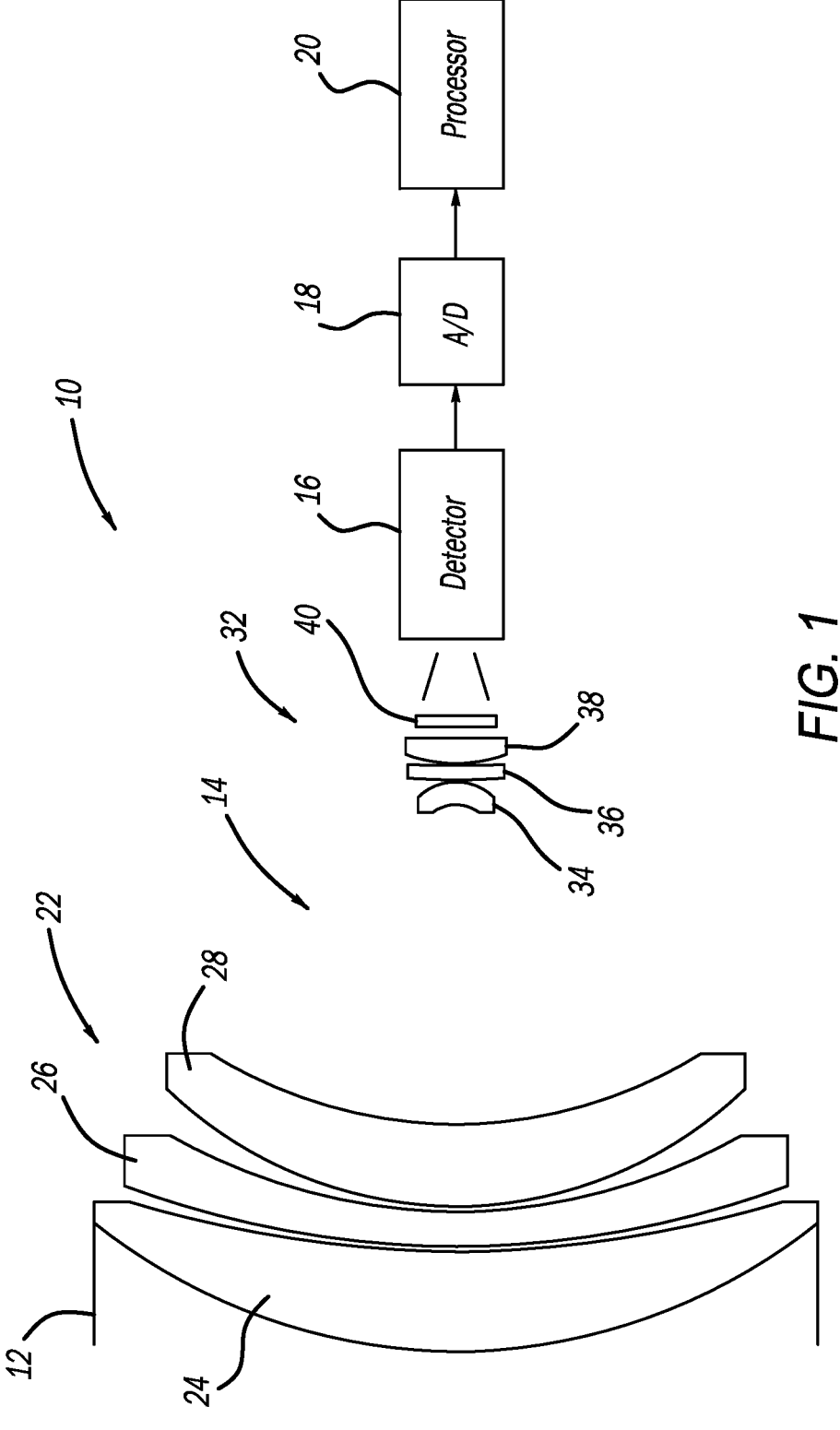
FIG. 1 is a side view of a telescope including a telephoto lens assembly having a planar optic metacorrector.

FIG. 1 is a side view of a telescope 10 including an aperture 12 and a telephoto lens assembly 14 that collects and focuses light received through the aperture 12, which is typically from a far distance and thus may be collimated. The light is focused by the lens assembly 14 onto a detector 16 including, for example, an array of photodiodes, charge-coupled devices (CCD) or detector/focal plane array sensitive to the operating wavelength that provides electrical signals to an analog-to-digital converter (ADC) 18 that provides digital signals to a processor 20 that prepares an image therefrom. The detector 16 and processor 20 can be configured to detect and process light of any suitable wavelength, such as infrared or visible light. The lens assembly 14 includes a primary or objective lens sub-assembly 22 of shorter focal length having three conventional refractive lenses 24, 26 and 28 that provide an intermediate focus of the light propagating through the aperture 12. In other designs, the lens sub-assembly 22 could have any suitable number of lenses and could include reflective lenses. A secondary lens sub-assembly 32 is positioned just behind the intermediate focus of the lens sub-assembly 22 in this implementation, but could also be a negative telephoto group placed before the intermediate focus. The lens sub-assembly 32 also includes three conventional refractive lenses 34, 36 and 38, but could be any suitable number of lenses and could include reflective lenses, that collect the light and focus the light onto the detector 16.

A metacorrector 40 is provided between the lens sub-assembly 32 and the detector 16 and is a diffractive optical element of the type discussed above that operates and is configured to correct aberrations in the focusing beam, and could also provide some focusing/defocusing power and remove residual secondary color in the light. The metacorrector 40 also operates to reduce the track length of the telephoto lens assembly 14, which can provide a telephoto ratio less than 1, and in some applications, less than 0.45. Further, by placing the metacorrector 40 relatively far from the intermediate focus, a smaller range of angle of incidence can be achieved, which makes the assembly 14 more robust. Also, athermalization is more easily accomplished because of the intermediate focus since an on-axis compensator is sufficient. In other words, the expansion and contraction of the elements in the assembly 10 in response to temperature changes does not significantly affect the performance of the assembly 10.

The angle of diffraction in a material changes with wavelength. The metacorrector 40 also provides diffraction in this manner. Undesired diffraction orders, which affect scattering efficiency of the desired order, appear for any non-monochromatic device because it's challenging to obtain the desired phase profile across all wavelengths. This is of particular concern for wide spectral band devices. The phase of a conventional diffractive element is the product of the refractive index of the material and the thickness. The dispersion is set by the chosen material, which limits the lens dispersion to that of available materials. It is not possible to independently control the dispersion. For the metacorrector 40, rather than changing the phase through the local thickness, the phase is changed by engineering the local effective refractive index, which is achieved by changing the unit cell's physical attributes. This offers some control over the effective medium's dispersion.

The amount of color that a lens of a given diameter has is proportional to its power. For a telephoto lens, the small telephoto ratios can be achieved by having a strong power first lens (or lens group) that focuses the rays down to a small diameter negative lens (or negative group). For example, to get a telephoto ratio of 0.50 but a system f # of f/2 may require a front end positive group that is f/1.0 or faster. If the system f# is not changed, but the telephoto ratio is made even smaller, for example, 0.40 or less, then that front group has to be even faster and be even stronger in power. The stronger that front group gets the more color it has. If the small negative lens group with other glasses corrects for primary color of the front group, then there is still secondary color and that will get bigger as the telephoto ratio gets smaller. So, for very extreme telephoto ratios such as 0.40 or smaller, an achromatized design will usually have a lot of residual color compared to a non-telephoto design. That makes the metacorrector 40 valuable as a way to fix secondary color if the design has an extreme telephoto ratio, which gives much more secondary color that needs fixing.

Figure 2:
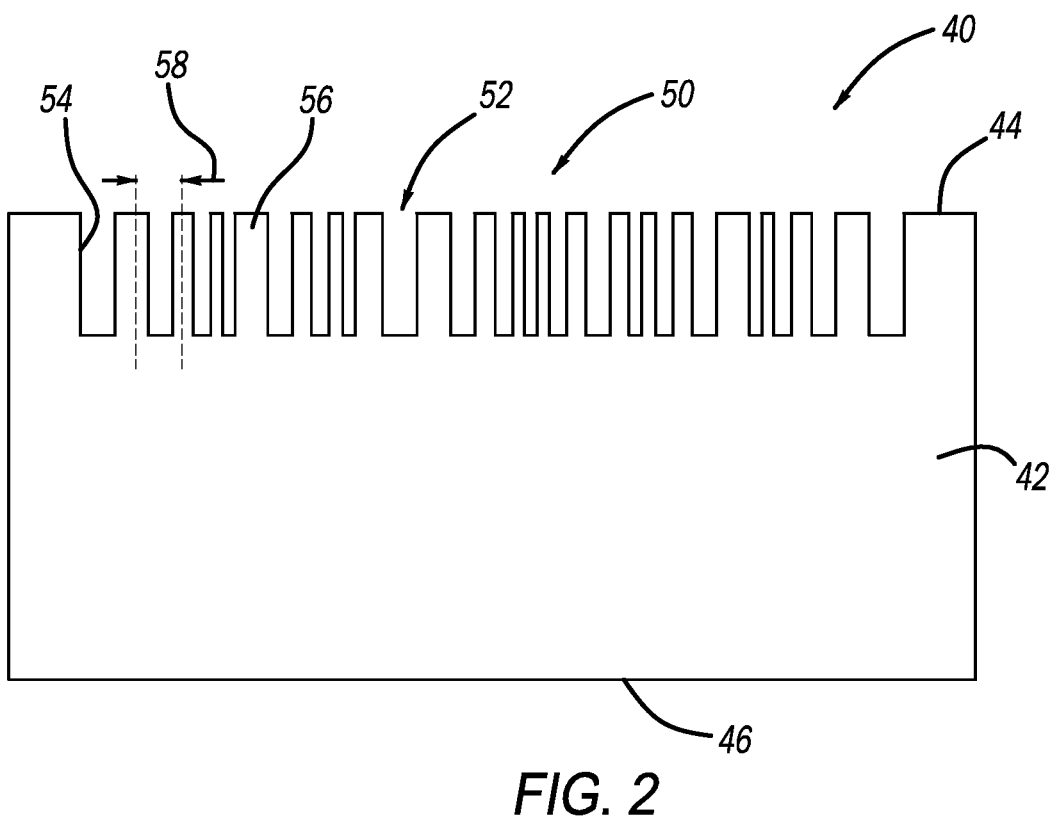
FIG. 2 is a side view of the metacorrector separated from the telephoto lens assembly.
Figure 3:
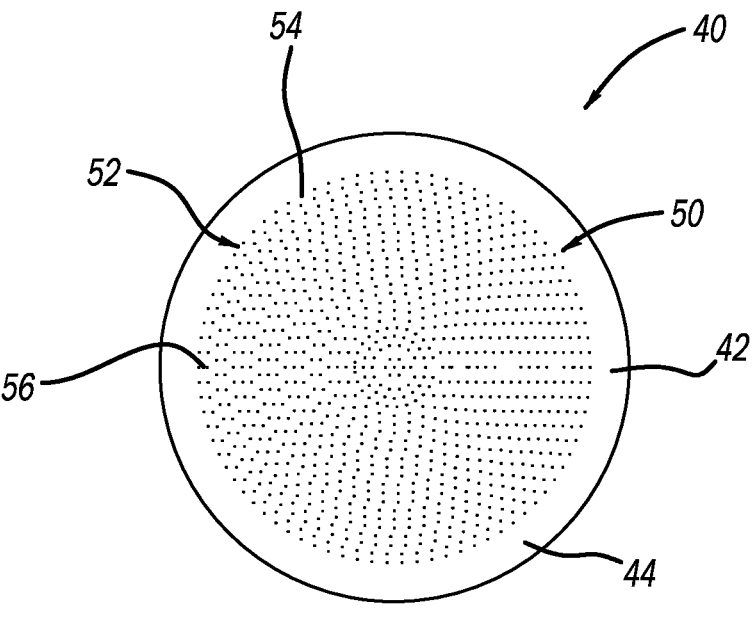
FIG. 3 is a rear view of the metacorrector separated from the telephoto lens assembly.

FIG. 2 is a side view and FIG. 3 is a rear view of the metacorrector 40 separated from the telephoto lens assembly 14. The metacorrector 40 includes a substrate 42 having a thickness depending on the particular application and the mechanical integrity required, and may be in the range of 200 nm to 1 mm, for example. The substrate 42 includes a flat plano front surface 46 facing the lens 38 and a flat plano rear surface 44 opposite to the lens 38, where the surfaces 44 and 46 are perpendicular to the propagation direction of the light in the Z-direction. In an alternate embodiment, the surfaces could be curved. The substrate 42 can be made of a single material or may be layered with different materials, where those materials would also depend on the particular application. For example, if the telescope 10 is imaging visible light, the material may be glass or any material that is transparent in the visible regime, and if the telescope 10 is imaging infrared light, the material may be silicon, germanium, gallium arsenide, zinc selenide, zinc, sulfide, calcium fluoride, other III-V semiconductor materials, or any material that is transparent in the IR regime.

The metacorrector 40 includes a metastructure 50 that can be interpreted as Fresnel rings 56 each having a series of spaced apart meta-atoms, here circular holes 54, that are etched a certain distance into the rear surface 44 of the substrate 42. The metastructure 50 causes the light to be diffracted in various controlled directions depending on where material exists and where material has been removed to obtain the desired aberration correction. The metastructure 50 is designed so that the configuration, i.e., the size and position, of the holes 54 in a radial direction provides the desired phase and thus desired beam profile. Providing the etched holes 54 instead of extended metaelements, such as pillars, may improve the dispersion of the light and increase bandwidth, where the meta-atom can take on more complex motifs in other designs, such as multilayer features. Alternately, the holes 54 can be etched into the front surface 46 of the substrate 42, or both of the surfaces 44 and 46. The metastructure 50 can also be applied onto the substrate 42 by a polymer transfer technique. The circular configuration of identical meta-atoms with the same radial distance from the center of the substrate 42 shown as annulus 52 is adjacent to a neighboring annulus 52 with meta-atoms that are identical to each other and could be different or identical to the neighboring annulus' meta-atoms. Each Fresnel ring 56 may contain one or many of these annuli. The lattice constant of a unit cell (meta-atom) 58 has an X and Y dimension that is on the order of ¼ of the wavelength $\lambda$ of the light being imaged. The size of the holes 54, the shape of the holes 54, the size of the unit cells 58, etc. are all application specific to provide the desired beam phase changes and aberration correction for the particular application and beam wavelength. The unit cells 58 provide a possible range of transmission/reflection phases that range from 0 to $2\pi$, which is a function of operating wavelength, selected material, meta-atom lattice constant and etch depth, shape, size and incident light properties, such as polarization and angle of incidence. Because the metacorrector 40 is placed at the rear of the telephoto lens assembly 14, the metacorrector 40 can be small, but enables use with large aperture telescopes for greater light collection, and also allows correction for field aberrations, such as coma and astigmatism, in addition to spherical and chromatic aberrations.

As discussed, the metacorrector 40 is positioned at the rear of the telephoto lens assembly 14. However, in other embodiments, the metacorrector 40 could be positioned at the front of the assembly 14, such as by replacing the lens 24 with the metacorrector 40. Since the lens 24 is relatively large and heavy, a weight savings could be realized by doing this. However, the metacorrector 40 would need to be much larger, which requires additional fabrication considerations, but otherwise is feasible. Further, certain aberrations caused by subsequent downstream optics may not be able to be corrected with the metacorrector 40 in that position.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A telephoto lens assembly comprising:
a primary lens sub-assembly including at least one lens, said primary lens sub-assembly being operable to collect and focus light;
a secondary lens sub-assembly including at least one lens, said secondary lens sub-assembly being operable to collect and focus light from the primary lens sub-assembly; and
a metacorrector positioned relative to the secondary lens sub-assembly and being responsive to the focused light from the secondary lens sub-assembly, said metacorrector including a metastructure that is configured to correct aberrations in the light, wherein the assembly has a telephoto ratio of less than 0.8, where the telephoto ratio is defined as the ratio of a physical total track length of the assembly to its focal length.

2. The assembly according to claim 1 wherein the metacorrector is also configured to provide focusing/defocusing power.

3. The assembly according to claim 1 wherein the metacorrector is also configured to remove residual secondary color in the light.

4. The assembly according to claim 1 wherein the metacorrector includes a substrate having a surface facing the secondary lens assembly and a surface opposite to the secondary lens sub-assembly.

5. The assembly according to claim 4 wherein the metastructure includes concentric spaced apart annuli where each annulus includes spaced apart holes etched into the substrate.

6. The assembly according to claim 5 wherein the holes are circular.

7. The assembly according to claim 4 wherein the metastructure is formed on the surface of the substrate facing the secondary lens assembly.

8. The assembly according to claim 4 wherein the metastructure is formed on the surface of the substrate opposite to the secondary lens assembly.

9. The assembly according to claim 4 wherein the metastructure is formed on both of the surfaces of the substrate.

10. The assembly according to claim 1 wherein the telephoto ratio is less than 0.45.

11. The assembly according to claim 1 wherein both the primary lens sub-assembly and the secondary lens sub-assembly include a plurality of refractive lenses.

12. The assembly according to claim 1 wherein the telephoto lens assembly is configured to image visible light.

13. The assembly according to claim 1 wherein the telephoto lens assembly is configured to image infrared light.

14. A telephoto lens assembly configured to image infrared light, said assembly comprising:
a primary lens sub-assembly including at least one lens, said primary lens sub-assembly being operable to collect and focus light;
a secondary lens sub-assembly including at least one lens, said secondary lens sub-assembly being operable to collect and focus light from the primary lens sub-assembly; and

a metacorrector positioned relative to the secondary lens sub-assembly and being responsive to the focused light from the secondary lens sub-assembly, said metacorrector including a substrate with a flat surface facing the secondary lens sub-assembly and a flat surface opposite to the secondary lens sub-assembly, said metacorrector further including a metastructure formed in one or both of the surfaces and having concentric spaced apart annuli where each annuli includes spaced apart holes etched into the substrate that correct aberrations in the light, wherein the assembly has a telephoto ratio of less than 0.8, where the telephoto ratio is defined as the ratio of a physical total track length of the assembly to its focal length.

15. The assembly according to claim 14 wherein the holes are circular.

16. The assembly according to claim 14 wherein the telephoto ratio is less than 0.45.

17. The assembly according to claim 14 wherein the metacorrector is configured to correct aberrations in the light, provide focusing/defocusing power and/or to remove residual secondary color in the light.

18. A telephoto lens assembly configured to image infrared light, said assembly comprising:
a primary lens sub-assembly including at least one lens, said primary lens sub-assembly being operable to collect and focus light;
a secondary lens sub-assembly including at least one lens, said secondary lens sub-assembly being operable to collect and focus light from the primary lens sub-assembly; and
a metacorrector positioned relative to the secondary lens sub-assembly and being responsive to the focused light from the secondary lens sub-assembly, said metacorrector including a metastructure that is configured to correct aberrations in the light, provide focusing/defocusing power and/or to remove residual secondary color in the light, wherein the assembly has a telephoto ratio of less than 0.45, where the telephoto ratio is defined as the ratio of a physical total track length of the assembly to its focal length.

19. A telephoto lens assembly comprising:
a primary lens sub-assembly including at least one lens, said primary lens sub-assembly being operable to collect and focus light;
a secondary lens sub-assembly including at least one lens, said secondary lens sub-assembly being operable to collect and focus light from the primary lens sub-assembly; and
a metacorrector provided in conjunction with the primary lens sub-assembly, said metacorrector including a metastructure that is configured to correct aberrations in the light, wherein the assembly has a telephoto ratio of less than 0.8, where the telephoto ratio is defined as the ratio of a physical total track length of the assembly to its focal length.

20. The assembly according to claim 19 wherein the telephoto ratio is less than 0.45.

* * * * *